F. F. BRACY.
VEHICLE SPRING.
APPLICATION FILED AUG. 11, 1920.

1,408,858.

Patented Mar. 7, 1922.
2 SHEETS—SHEET 1.

Inventor
F. F. Bracy,
By Wm. L. Symons
Attorney

F. F. BRACY.
VEHICLE SPRING.
APPLICATION FILED AUG. 11, 1920.

1,408,858.

Patented Mar. 7, 1922.
2 SHEETS—SHEET 2.

Inventor
F. F. Bracy,
By Wm. L. Symons
Attorney

UNITED STATES PATENT OFFICE.

FURNEY F. BRACY, OF HALLSBORO, NORTH CAROLINA.

VEHICLE SPRING.

1,408,858.	Specification of Letters Patent.	Patented Mar. 7, 1922.

Application filed August 11, 1920. Serial No. 402,790.

*To all whom it may concern:*

Be it known that I, FURNEY F. BRACY, a citizen of the United States of America, residing at Hallsboro, in the county of Columbus and State of North Carolina, have invented certain new and useful Improvements in Vehicle Springs, of which the following is a specification.

My invention relates to improvements in vehicle springs, and particularly to the class consisting of two pieces and having means to prevent shock and also to render the spring unbreakable.

A further object of my invention is the production of a spring that is suitable for vehicles, such as automobiles, which require a resilient spring which must also be strong enough to support the weight of the engine.

A still further object is the construction of a spring which is strengthened and rendered resilient by coil springs.

With these and further objects in view, which will be stated in the complete description and pointed out in the claims, one form of my invention is shown in the accompanying drawings, in which—

Figure 1:
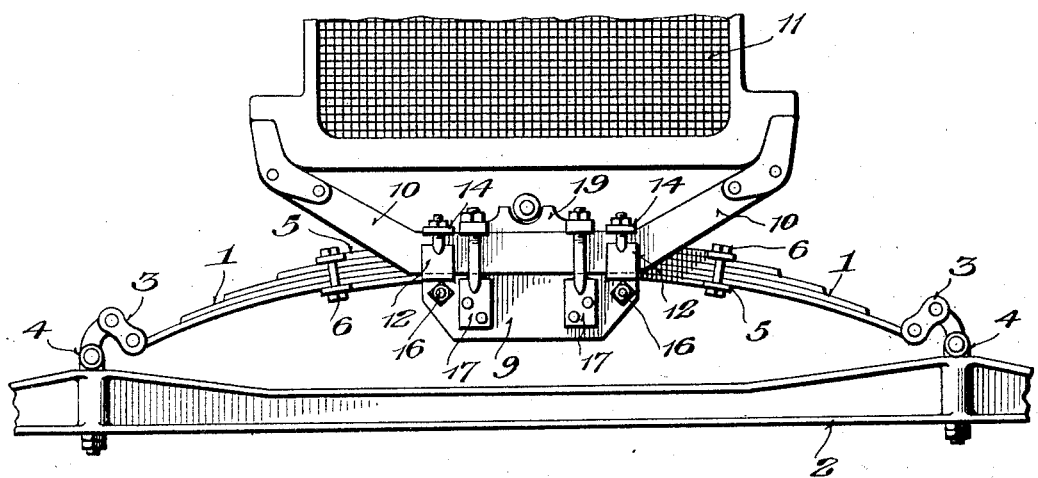
Figure 1 is a front view of my invention as applied to an automobile, a part of an axle and a part of the radiator of a conventional automobile construction being disclosed.
Figure 2:
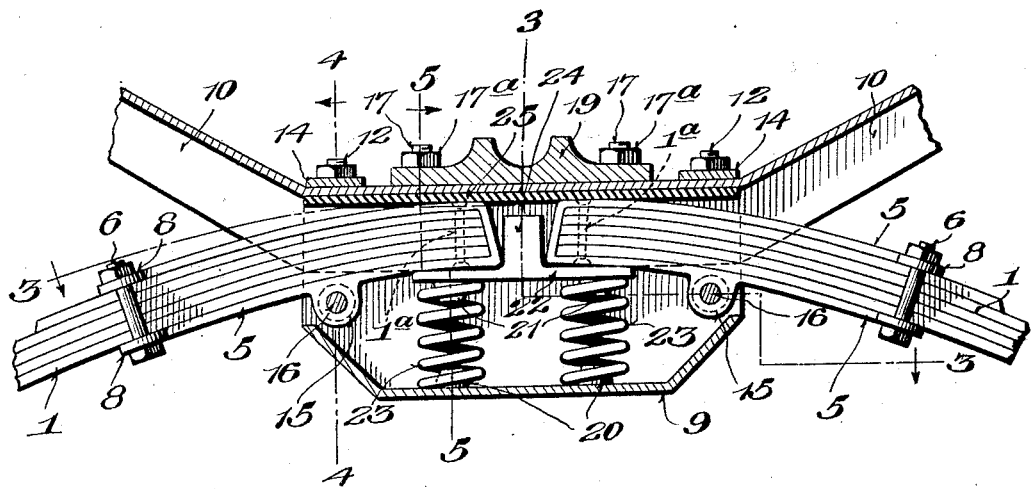
Figure 2 is a vertical transverse section.
Figure 3:
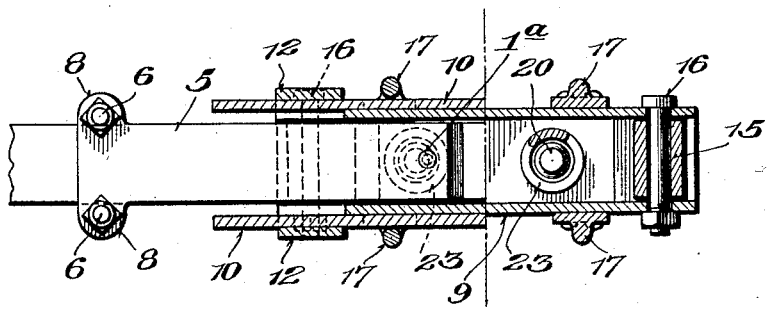
Figure 3 is a section on the line 3—3 of Figure 2.

My invention as illustrated in this application is applied to the front axle of a Ford car.

A spring 1 consisting of two parts which are duplicates, made up as here illustrated of five leaves, which are held together at the upper ends by suitable means such as rivets 1ᵃ, is attached to the front axle 2 of a vehicle by any suitable means, such as toggle 3 secured to posts 4 attached to the axle. Over the upper ends of both parts of the spring is placed a U-shaped strap 5 attached to the spring by means of bolts 6 extending on either side of the spring through openings 7 in ears 8 on the outer ends of the strap 5. These straps 5 extend approximately one-third of the distance from the upper end of the spring. The strap acts as two leaves of the spring and secures the ends of the spring together.

Figure 4:
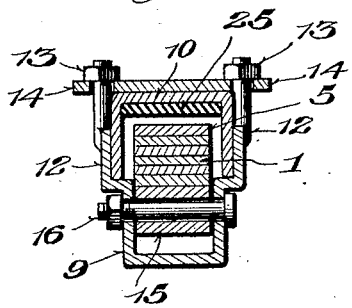
Figure 4 is a section on the line 4—4 of Figure 2.
Figure 5:
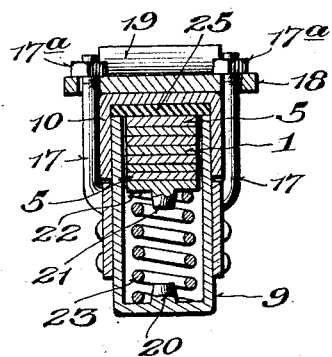
Figure 5 is a section on the line 5—5 of Figure 2.
Figure 6:
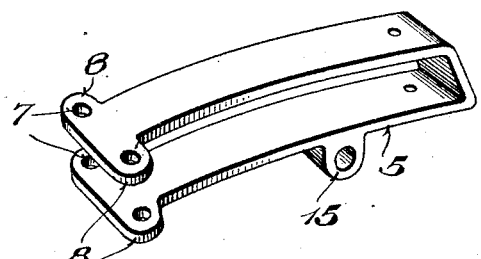
Figure 6 is a perspective of one of the U-shaped spring straps.

The ends of the spring, and other parts to be described later, are enclosed in a casing 9 which is attached to the radiator supporting beam 10. This beam is secured to the radiator 11, a part only of which is shown, in any suitable manner. The means shown for attaching the casing 9 comprises two pairs of extensions 12, the tops of which are screw-threaded to receive nuts 13 which secure plates 14, as shown in Figure 4. The U straps have ears 15 on the lower parts thereof through which extend bolts 16 which assist in securing together the casing 9 and the two spring members.

Attached to the casing 9 are two other pairs of extensions 17, the ends of which extend above the beam 10. Clamping members 18 placed above a bar 19 and held in place by nuts 17ᵃ hold the said bar in place and assist in joining together the different parts of the device.

Extending upward from the lower part of the casing 9 are two seats 20 which cooperate with two seats 21 on a spring equalizer 22 to keep in position coil springs 23. This equalizer has a part 24 extending upward between the two U straps to within a short distance of the top of the casing. A rubber cushion 25 is placed across the top of the U straps just beneath the upper part of the casing.

The operation of my device will be clearly understood from the foregoing description. When the vehicle passes rapidly over a rough place in a road, the great strain which often results in breaking the ordinary spring is distributed by my device so that it is borne by different elements,—that is, by the leaf spring, the two coil springs, and the parts of the casing. A very heavy load placed on this spring will not result in breaking it, for my invention does away with the weak point in the ordinary leaf spring. I have made the spring in two parts, which prevents a break near the middle or highest point of the spring. It is practically impossible to break the leaf springs as used by me. If through carelessness or accident a load is placed on my spring which in use is sufficient to crush the coil spring, it can be easily replaced and without the expense incident to replacing the ordinary one-piece leaf spring.

I claim:

1. A vehicle spring comprising a two-part spring, means to support the upper ends of said two parts consisting of an equalizer having an extension on the upper part thereof, said extension extending between the ends of said two-part spring, and means to hold said equalizer in place.

2. A vehicle spring comprising a two-part spring, each part comprising a plurality of leaves, means to support the upper ends of said parts consisting of an equalizer having an extension on the upper part thereof, said extension extending between the ends of said parts, and means comprising a coil spring to hold said equalizer in place.

3. A vehicle spring comprising a two-part spring, means to support the upper ends of said parts consisting of an equalizer having an extension on the upper part thereof, said extension extending between the ends of said parts, spring means to hold said equalizer in place, and a member surrounding the upper ends of said two-part spring, the lower end of said member being open and said lower end being clamped around said two-part spring.

4. A vehicle spring comprising a two-part spring, means to support the upper ends of said parts consisting of an equalizer having an extension on the upper part thereof, said extension extending between the ends of said parts, spring means to hold said equalizer in place, a member surrounding the upper ends of said two-part spring, and a casing attached to said spring parts.

5. A vehicle spring comprising a two-part spring, means to support the upper ends of said parts consisting of an equalizer having an extension extending between the ends of said parts, spring means to hold said equalizer in place, and a member surrounding the upper ends of said two-part spring, the lower end of said member being open and said lower end being clamped to said two-part spring.

In testimony whereof I affix my signature.

FURNEY F. BRACY.